(12) United States Patent
Maffeis

(10) Patent No.: US 8,267,449 B2
(45) Date of Patent: Sep. 18, 2012

(54) SUPPORT DEVICE FOR PREHENSILE MEMBERS

(75) Inventor: Giuseppe Maffeis, Roncadelle (IT)

(73) Assignee: Gimatic S.p.A., Roncadelle (Brescia) (IT)

( * ) Notice: Subject to any disclaimer, the term of this patent is extended or adjusted under 35 U.S.C. 154(b) by 261 days.

(21) Appl. No.: 12/720,892

(22) Filed: Mar. 10, 2010

(65) Prior Publication Data
US 2010/0230984 A1 Sep. 16, 2010

(30) Foreign Application Priority Data
Mar. 11, 2009 (IT) .............................. BS2009A0043

(51) Int. Cl.
*B25J 15/06* (2006.01)
(52) U.S. Cl. ........................................ 294/183; 294/189
(58) Field of Classification Search .................. 294/183, 294/185, 186, 189; 901/40; 414/627, 737
See application file for complete search history.

(56) References Cited

U.S. PATENT DOCUMENTS

| | | | | |
|---|---|---|---|---|
| 5,193,776 A | * | 3/1993 | Nagai et al. | 188/67 |
| 5,904,387 A | * | 5/1999 | Nagai et al. | 294/189 |
| 6,161,886 A | * | 12/2000 | Furuya et al. | 294/183 |
| 6,505,397 B1 | * | 1/2003 | Mimata et al. | 29/740 |
| 6,851,914 B2 | * | 2/2005 | Hirata | 414/627 |
| 7,004,522 B2 | * | 2/2006 | Nagai et al. | 294/185 |
| 2007/0059149 A1 | * | 3/2007 | Rich | 414/752.1 |

* cited by examiner

*Primary Examiner* — Dean Kramer
(74) *Attorney, Agent, or Firm* — McGlew and Tuttle, P.C.

(57) ABSTRACT

A support device for pneumatic prehensile members, in particular suction cups, for picking up and moving the parts, items and the like. It includes a fixed support body (support body) a tubular rod (12) moving axially in the body, and a return spring (13) between the body and rod. Between the tubular rod (12) and a distal end of the fixed support body (support body) are interposed some guide elements (14) provided to prevent torsion/rotation of the rod during its longitudinal movements in and with respect to the fixed body.

8 Claims, 3 Drawing Sheets

SUPPORT DEVICE FOR PREHENSILE MEMBERS

FIELD OF THE INVENTION

This invention concerns a support device for pneumatic prehensile members, such as suction cups, connectable to a suction system to control the action.

STATE OF THE TECHNIQUE

In some sectors pneumatic prehensile members are already used, in particular in the form of suction cups, to pick up parts, items and loads, etc., to be moved by means of manipulators, robots or the like and having a surface the suction cups can grip. The suction cups can be used individually or together with others depending on the dimensions and/or weight of the part or item to be moved, assembled on a support frame, each by means of a support device, and connected to a vacuum device. They are drawn near a surface of the part or item to be picked up, making them rest against and then tightly adhere to it by using a suction device.

According to the known technique, a supporting device for the suction cups designed for the abovementioned use comprises a fixed support body and a mobile tubular rod, guided axially in said body and susceptible to axial movements opposed by a return spring. One end of the tubular rod is connected to, and supports, a suction cup, whereas its opposite end is linked, directly or indirectly, to a tube in communication with the vacuum device.

The return spring however is positioned in the support body to operate so as:

to normally maintain the rod in an advanced position, in which it extends beyond the end of the support body on the side of the vacuum device, when the latter is idle, to allow the tubular rod carry out varying lengths of backward strokes, so as to adapt, from time to time, the position of the vacuum device to the surface it has to adhere to, and to then return the tubular rod to the forward, starting, position when the vacuum device is idle and at a distance from said surface.

In this embodiment of the invention the supporting device is relatively simple, but not without on drawback.

In fact, given the presence of a spring between the support body and the mobile rod, the latter, when moved fully forward it finds itself guided in said body only for a limited stretch, contiguous to the spring. So the rod is in an uncertain guide condition and such as not to exclude its torsion under force or due to the stress on the part of the suction ducts, a stress that can give rise to the rod sticking when moving back and therefore to malfunctions of the device itself.

OBJECTIVES AND SUMMARY OF THE INVENTION

The objective of this invention is to efficiently avoid the abovementioned drawback of the known technique.

Correspondingly, another objective of the invention is to propose a support device for the pneumatic prehensile members, in particular suction cups, in which the mobile rod is guided and slides more correctly in the body in each of the positions it undertakes and consequently is not subject to torsion and producing the self-defeating effect of sticking.

A further objective is to be able to make use of a support device for suction cups which is efficient and reliable under all working conditions, and furthermore which is simple, not cumbersome and particularly light in weight, all aspects that become mainly important in the pick-up system with a multiplicity of suction cups on a same support frame.

Said objectives are reached with a support device for prehensile members such as suction cups according to the introduction of claim 1 and where between the tubular rod and the distal end of the support body are inserted guide means for preventing the torsion/rotation of the rod during its longitudinal movements starting from the position in which it emerges most out of said body.

Advantageously the guide means include elements that help in the sliding of the rod of the support body, besides acting as an anti-torsion means in particular when the rod is in an advanced position.

Furthermore these rotation means are radialy stressed and kept in the operating position by flexible preloading means.

BRIEF DESCRIPTION OF THE DRAWINGS

The invention will however be illustrated in greater detail in the continuation of the present description made in reference to the attached indicative and not limiting drawings, in which.

DETAILED DESCRIPTION OF THE INVENTION

As shown, the device proposed herein basically comprises a support body, a mobile rod 12, a return spring 13 and guide and anti-torsion means 14 for the mobile rod.

Figures 1, 2:
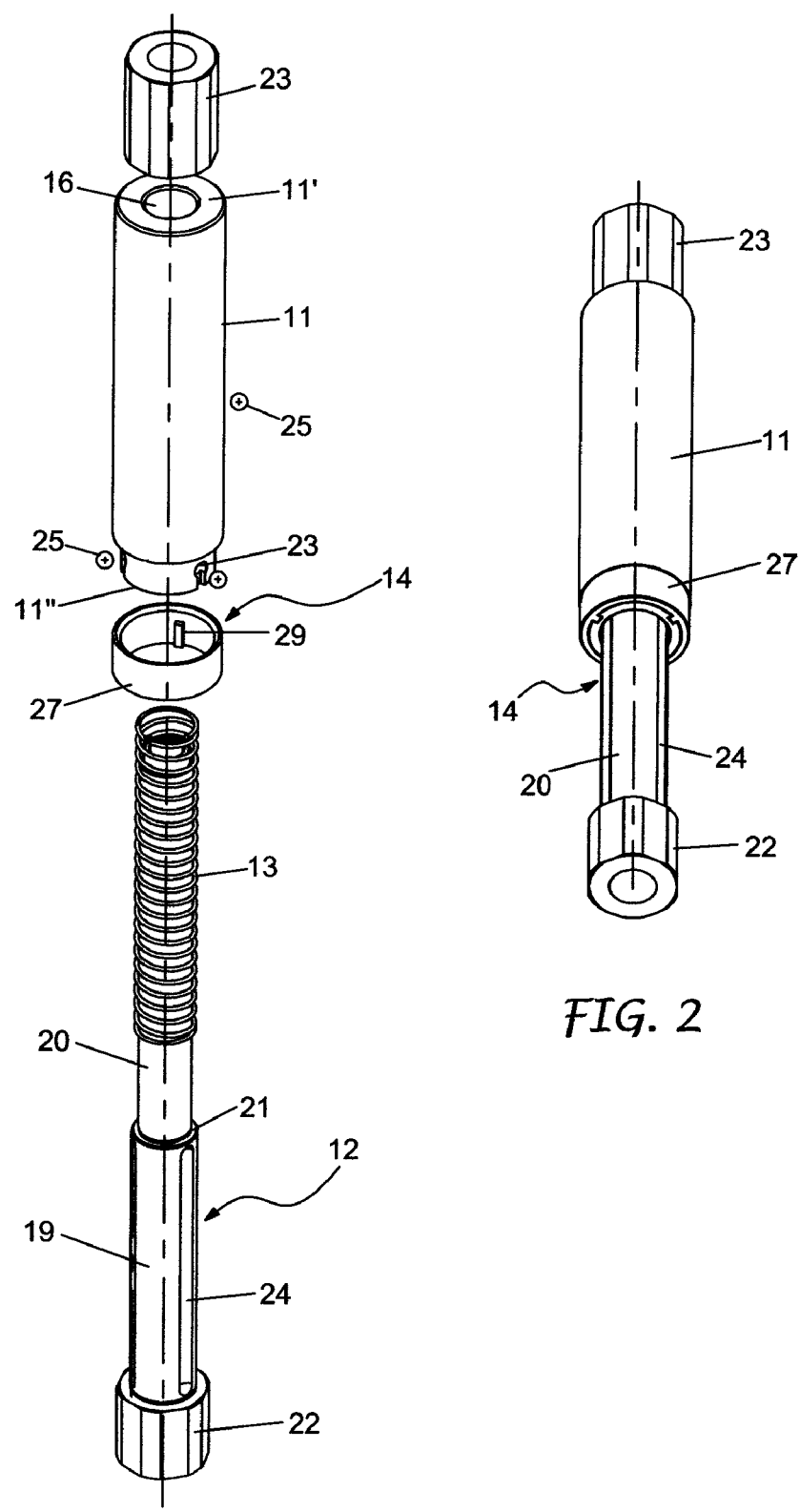
FIG. 1 shows a blowup view of the components of the support device.
FIGS. 2 and 3 show, respectively, a view in perspective and section plane of the assembled device.
Figure 3:
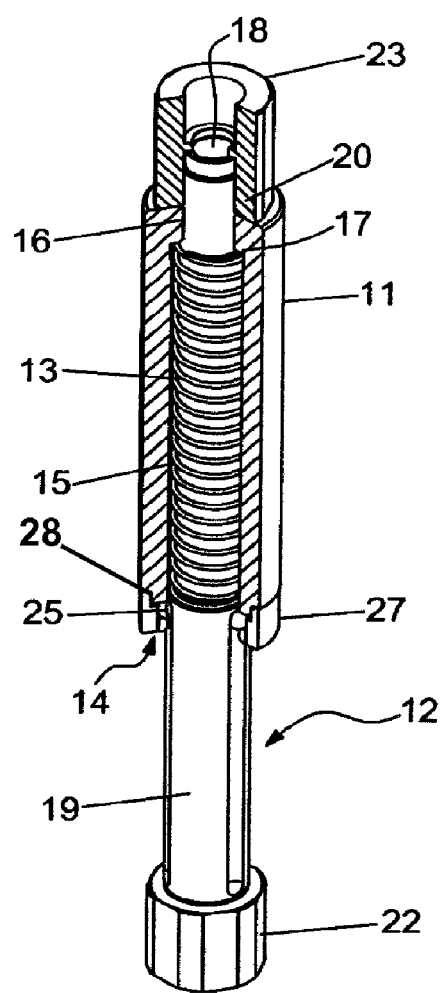

The support body has an end or rear, and a distal end, or front, and it forms an axial guide hole 15. This hole has a basically constant diameter for all the length of the body starting from the distal end, except for a part which is tapered 16, that is with a smaller diameter, on nearing the proximal end of the body. Furthermore, the axial guide hole 15 and its tapered part 16 form between them an annular striking surface 17—FIG. 2.

Externally, the support body can be cylindrical, at least partially threaded and provided with means—not shown—such as nuts or ring nuts, for fixing it to an arm or a support frame and with movements carried out by a manipulator, robot or some other means.

As an alternative, said body can be smooth on the outside and be provided with clamps or the like for fixing it when operating on an arm or movable frame.

The movable cylindrical-tubular rod 12 has an axial through passage 18 and has a longer length than that of the support body. The rod 12 is housed and is longitudinally movable in the axial bore 15, 16 of said support body. In more detail, it has a first portion 19 of its length with an external diameter larger than the second remaining portion 20. The diameter of the axial bore of said first portion 19 corresponds to the diameter of the axial bore 15 of the support body and that of the second portion 20 to the diameter of the tapered part 16 of said axial bore contiguous to the proximal end of the body. The first portion 19 and the second portion 20 of the rod 12 between them form an annular step 21—FIGS. 2 and 5.

The rod 12 is housed in the support body so that its first portion 19, with a larger diameter, emerges from the front of the distal end and its second portion 20, with a smaller diameter; emerges from the proximal end of the body. The first portion 19 of the rod is provided with a terminal head 22 to which a gripper device is connectable, such as a vacuum device—not shown. To the second portion 20 of the rod is fixed a nipple or terminal connector 23 which is connectable to a suction duct—not shown—controlled by a diffusion group.

The return spring 13 is assembled inside the support body between the latter and the second smaller diameter portion 20 of the rod, and it is held axially and compressible between the annular striking surface 17 on the side of the support body and the annular step 21 on the side of the rod 12.

Figure 7:
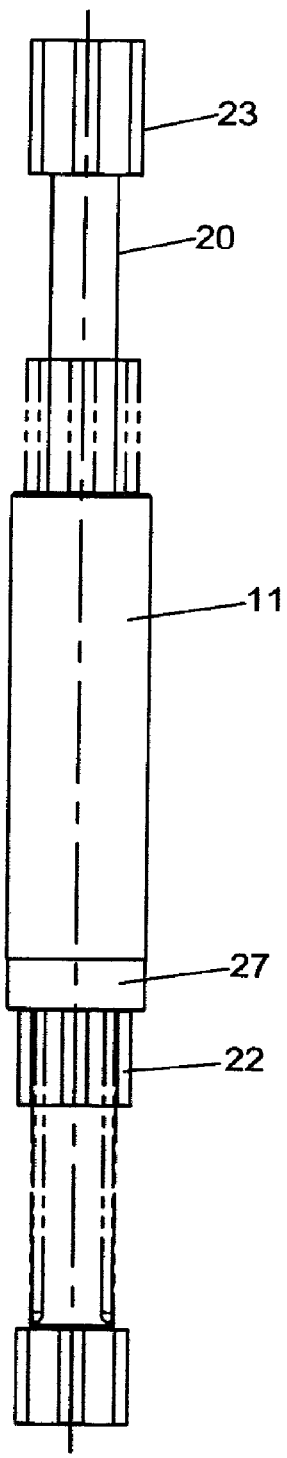
FIG. 7 shows a side view of the device with the rod in the retracted position.
Figure 4:
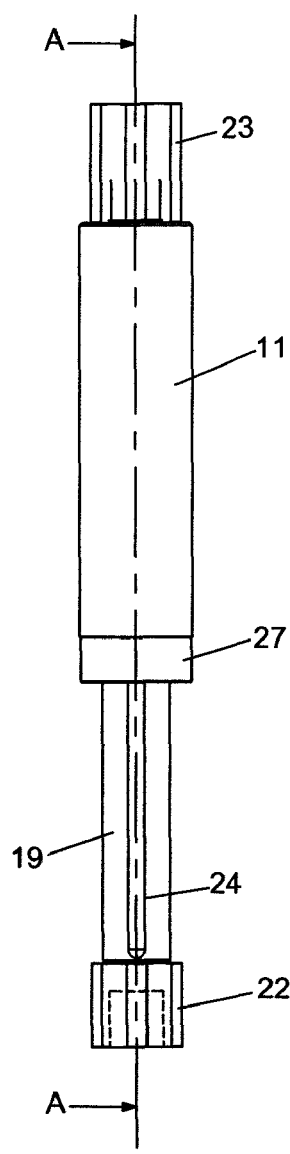
FIG. 4 shows a side view of the device with the rod in the forward position.

The movable rod 12 is guided and moveable in the body of the support body between two end positions: one advanced, limited by the resting of the nipple 23 against the proximal end of the support body, and one retracted, limited by the resting of the head 22 of the rod against the distal end of the support body"—FIG. 7.

The guide and anti-torsion means 14 are placed between the distal end of the support body and the first portion 19 of the moveable rod 12. They are made up of longitudinal guide grooves 24 provided along the first portion 19 of the moveable rod, in guide devices, preferably rolling, such as balls 25, housed in radial bores 26 at the distal end of the body and engaging in said grooves, and in a collar 27 holding some balls, positioned around said distal end of the support body on a level with a depressed part 28 of said body. Preferably, the collar is such as not to increase the radial dimensions of the support body, and made of a basically flexible material, for example nylon, and, on the inside it is provided with radial dentils 29 facing towards and resting against the balls to make sure they couple with a certain preload with the guide grooves 24.

Figure 5:
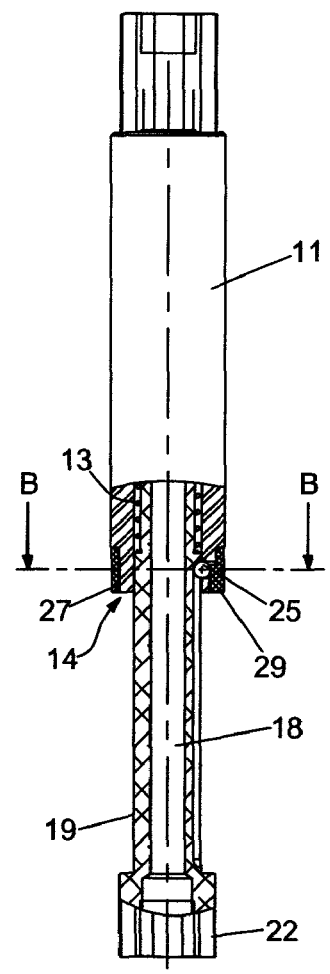
FIG. 5 shows a partial section of the device in direction of arrows A-A in FIG. 4.
Figure 6:
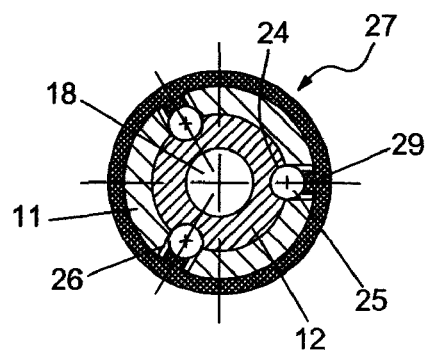
FIG. 6 shows a cross section of the device in direction of arrows B-B in FIG. 5.

All together, the return spring 13 acts so as to maintain and return the rod 12 into the forward position, in which its first portion 19 emerges out of the distal end of the fixed body of the support body, remaining however always partially fitted into the axial bore 15 so that the guide balls 25 always remain coupled to the respective guide grooves 24—FIG. 5.

The rod of the support body moves back towards the retracted position, compressing the spring 13 in different ways, depending on the position of the surface on which the gripper device, that is the vacuum device, finds itself from time to time resting on and engaged to. Then, when it is resting on the surface of the item or load to be moved, the vacuum device is activated by the application of the rod, from behind, by a suction of the supporting device. Subsequently, as soon as the suction stops the vacuum device moves away from the surface it was adhered to and with the removal of the device from said surface, the rod, stressed by the return spring 13, moves back into the advanced position.

During all its movements from any other position the rod however remains guided axially and centred in the fixed body tank to the guide means without any substantial possibility of torsion.

What is claimed is:

1. A support device for pneumatic prehensile members, comprising:
   a support body with a distal end and a proximal end;
   a tubular rod moving axially in said body;
   a return spring between said body and said rod, wherein the tubular rod holds a suction cup at one end and which can be moved axially between a forward position, in which said tubular rod protrudes from the distal end of said body via the return spring, and a retracted position, when the suction cup rests against a surface which the suction cup grips due to one or more of intake pressure and suction pressure applied by the suction cup by means of the tubular rod, said support body having a bore with a basically constant diameter starting from the distal end and a tapered part near the proximal end, said tubular rod having a greater length than the support body and a first portion of a length of the tubular rod having an external diameter greater than a second remaining length, wherein said first portion connects with the axial bore of the support body and said second portion connects with the tapered part of said axial bore, the suction cup being applied to the free end of said first portion and suction being applied to the free end of said second portion of the tubular rod;
   a guide means between the movable tubular rod and the distal end of the support body for preventing one or more of torsion of said rod and rotation of said rod during longitudinal movements of said rod in said body.

2. A support device according to claim 1, wherein said guide means comprises longitudinal guide grooves along the first portion of the movable rod, balls housed in radial bores at the distal end of the support body and engaged in said longitudinal grooves, and a constraining collar of said balls placed around said distal end of the support body.

3. A support device according to claim 2, wherein said balls are a rolling type, made up of small bearings fitted in said longitudinal guide grooves.

4. A support device according to claim 3, wherein the constraining collar is made of a relatively flexible material and has radial serrations facing towards and resting against said bearings to connect said bearings with a given preloading with said longitudinal guide grooves.

5. A support device according to claim 2, wherein the constraining collar is made of a relatively flexible material and has radial serrations facing towards and resting against said bearings to connect said bearings with a given preloading with said longitudinal guide grooves.

6. A support device for pneumatic prehensile members, comprising:
   a support body with a distal end and a proximal end;
   a tubular rod moving axially in said body;
   a return spring between said body and said rod, wherein the tubular rod holds a suction cup at one end and which can be moved axially between a forward position, in which said tubular rod protrudes from the distal end of said body via the return spring, and a retracted position, when the suction cup rests against a surface which the suction cup grips due to one or more of intake pressure and suction pressure applied by the suction cup by means of the tubular rod, said support body having a bore with a basically constant diameter starting from the distal end and a tapered part near the proximal end, said tubular rod having a greater length than the support body and a first portion of a length of the tubular rod having an external diameter greater than a second remaining length, wherein said first portion connects with the axial bore of the support body and said second portion connects with the tapered part of said axial bore, the suction cup being applied to the free end of said first portion and suction being applied to the free end of said second portion of the tubular rod, said return spring being arranged between said support body and said second portion of said tubular rod;

a guide means between the movable tubular rod and the distal end of the support body for preventing one or more of torsion of said rod and rotation of said rod during longitudinal movements of said rod in said body.

7. A support device according to claim 6, wherein said return spring is placed and is compressible between an annular striking surface inside the support body and an annular step which is between the first part and the second part of the tubular rod.

8. A support device for pneumatic prehensile members, comprising:

a support body with a distal end and a proximal end;

a tubular rod moving axially in said body;

a return spring between said body and said rod, wherein the tubular rod holds a suction cup at one end and which can be moved axially between a forward position, in which said tubular rod protrudes from the distal end of said body via the return spring, and a retracted position, when the suction cup rests against a surface which the suction cup grips due to one or more of intake pressure and suction pressure applied by the suction cup by means of the tubular rod, said support body having a bore with a substantially constant diameter starting from the distal end and a tapered part near the proximal end, said tubular rod having a greater length than the support body and a first portion of a length of the tubular rod having an external diameter greater than a second remaining length, wherein said first portion connects with the axial bore of the support body and said second portion connects with the tapered part of said axial bore, the suction cup being applied to the free end of said first portion and suction being applied to the free end of said second portion of the tubular rod, said first portion of the tubular rod having a terminal head holding the suction cup and said second portion being provided with a nipple or union to connect said second portion to a suction source, the forward position and the retracted position of the rod being limited by said nipple or union and by said head together with the proximal end and the distal end of the support body;

a guide means between the movable tubular rod and the distal end of the support body for preventing one or more of torsion of said rod and rotation of said rod during longitudinal movements of said rod in said body.

\* \* \* \* \*